United States Patent
Yanagisawa et al.

(10) Patent No.: US 11,467,572 B2
(45) Date of Patent: Oct. 11, 2022

(54) MOVING OBJECT OPERATION SYSTEM, OPERATION SIGNAL TRANSMISSION SYSTEM, MOVING OBJECT OPERATION METHOD, PROGRAM, AND RECORDING MEDIUM

(71) Applicant: NEC Solution Innovators, Ltd., Tokyo (JP)

(72) Inventors: Hiroaki Yanagisawa, Tokyo (JP); Koji Morishita, Tokyo (JP); Hisashi Noda, Tokyo (JP)

(73) Assignee: NEC Solution Innovations, Ltd., Tokyo (JP)

( * ) Notice: Subject to any disclaimer, the term of this patent is extended or adjusted under 35 U.S.C. 154(b) by 778 days.

(21) Appl. No.: 16/321,492

(22) PCT Filed: Apr. 4, 2017

(86) PCT No.: PCT/JP2017/014085
§ 371 (c)(1),
(2) Date: Jan. 29, 2019

(87) PCT Pub. No.: WO2018/020744
PCT Pub. Date: Feb. 1, 2018

(65) Prior Publication Data
US 2021/0286352 A1     Sep. 16, 2021

(30) Foreign Application Priority Data
Jul. 29, 2016   (JP) .............................. JP2016-150570

(51) Int. Cl.
*G05D 1/00*     (2006.01)
*B64C 39/02*    (2006.01)
(Continued)

(52) U.S. Cl.
CPC ......... *G05D 1/0016* (2013.01); *B64C 39/024* (2013.01); *G05D 1/0094* (2013.01); (Continued)

(58) Field of Classification Search
CPC .... G05D 1/0016; G05D 1/0094; G05D 1/101; B64C 39/024; B64C 2201/146; A63H 30/04
See application file for complete search history.

(56) References Cited

U.S. PATENT DOCUMENTS

| | | |
|---|---|---|
| 5,999,185 A | 12/1999 | Kato et al. |
| 6,128,018 A | 10/2000 | Nakajima |

(Continued)

FOREIGN PATENT DOCUMENTS

| | | |
|---|---|---|
| CN | 103426282 A | 12/2013 |
| CN | 103620527 A | 3/2014 |

(Continued)

OTHER PUBLICATIONS

Japanese Office Action for JP Application No. 2018-529413 dated Jan. 21, 2020 with English Translation.

(Continued)

*Primary Examiner* — Peter D Nolan
*Assistant Examiner* — Roy Rhee
(74) *Attorney, Agent, or Firm* — Sughrue Mion, PLLC

(57) ABSTRACT

The present invention provides a new system that allows an easier operation of a moving object. The present invention provides a moving object operation system including: a moving object; and an operation signal transmitter. The moving object includes a signal receipt unit that receives an operation signal. The transmitter includes: an auxiliary tool; a storage unit that contains conversion information; a movement information acquisition unit that acquires auxiliary tool movement information; a conversion unit that converts the (Continued)

acquired movement information into the operation signal based on the conversion information; and a signal transmission unit that transmits the operation signal. The conversion information includes auxiliary tool movement information and operation signal information for instructing the moving object in how to move, and those are associated with each other. The movement information associated with human motion is auxiliary tool movement information associated with human motion imagining movement of the moving object.

18 Claims, 10 Drawing Sheets

(51) Int. Cl.
    *G05D 1/10* (2006.01)
    *A63H 30/04* (2006.01)
(52) U.S. Cl.
    CPC .............. *G05D 1/101* (2013.01); *A63H 30/04* (2013.01); *B64C 2201/146* (2013.01)

(56) References Cited

U.S. PATENT DOCUMENTS

| | | | |
|---|---|---|---|
| 6,154,197 | A | 11/2000 | Watari et al. |
| 6,431,982 | B2 | 8/2002 | Kobayashi et al. |
| 7,071,914 | B1 | 7/2006 | Marks |
| 9,052,710 | B1 | 6/2015 | Farwell |
| 9,211,644 | B1 | 12/2015 | Checka |
| 9,870,716 | B1 | 1/2018 | Rao et al. |
| 10,216,177 | B2 | 2/2019 | Gildert et al. |
| 10,514,687 | B2 | 12/2019 | Brooks et al. |
| 10,627,860 | B2 | 4/2020 | Jacobsen et al. |
| 10,745,132 | B1 | 8/2020 | Kimchi |
| 10,768,708 | B1 | 9/2020 | Sills et al. |
| 2009/0222149 | A1* | 9/2009 | Murray ............... B64C 39/024 701/2 |
| 2010/0235034 | A1 | 9/2010 | Higgins |
| 2011/0124385 | A1 | 5/2011 | Otomo et al. |
| 2011/0274358 | A1 | 11/2011 | Higgins |
| 2012/0127176 | A1 | 5/2012 | Margolis |
| 2012/0287284 | A1 | 11/2012 | Jacobsen et al. |
| 2013/0176302 | A1 | 7/2013 | Jeong et al. |
| 2013/0293362 | A1 | 11/2013 | Parazynski |
| 2013/0300649 | A1 | 11/2013 | Parkinson et al. |
| 2015/0261217 | A1 | 9/2015 | Gil |
| 2016/0077608 | A1 | 3/2016 | Nakasu et al. |
| 2016/0232793 | A1 | 8/2016 | Morishita et al. |
| 2016/0292905 | A1 | 10/2016 | Nehmadi et al. |
| 2016/0349835 | A1 | 12/2016 | Shapira |
| 2018/0072226 | A1 | 3/2018 | Bunch |
| 2018/0210979 | A1 | 7/2018 | Jeong et al. |
| 2018/0259960 | A1* | 9/2018 | Cuban ................... H04N 5/232 |
| 2019/0023392 | A1 | 1/2019 | Micros |
| 2020/0241575 | A1* | 7/2020 | Meisenholder .......... G05D 1/12 |
| 2021/0286352 | A1 | 9/2021 | Yanagisawa et al. |

FOREIGN PATENT DOCUMENTS

| | | |
|---|---|---|
| CN | 104748730 A | 7/2015 |
| CN | 105222761 A | 1/2016 |
| CN | 105739525 A | 7/2016 |
| CN | 105759833 A | 7/2016 |
| DE | 69635710 T2 | 8/2006 |
| JP | 06152440 A | 5/1994 |
| JP | 089224 A | 1/1996 |
| JP | 2007188309 A | 7/2007 |
| JP | 2010158350 A | 7/2010 |
| JP | 2010262477 A | 11/2010 |
| JP | 2012509812 A | 4/2012 |
| JP | 2015006875 A | 1/2015 |
| JP | 2015-504616 A | 2/2015 |
| JP | 2016-062274 A | 4/2016 |
| WO | 2012154938 A1 | 11/2012 |
| WO | 2013/105443 A1 | 7/2013 |
| WO | 2014107219 A1 | 7/2014 |
| WO | 2015/014116 A1 | 2/2015 |
| WO | 2015040893 A1 | 3/2015 |

OTHER PUBLICATIONS

Japanese Office Action for JP Application No. 2020-071621 dated Jan. 26, 2021 with English Translation.
Rudnick, G., et al., "Scalable Autonomy Concept for Reconnaissance UAVs on the Basis of an HTN Agent Architecture", 2016 International Conference on Unmanned Aircraft System (ICUAS), Jun. 7-10, 2016, pp. 40-46.
International Search Report, dated Jun. 20, 2017 from the International Bureau in counterpart International application No. PCT/JP2017/014085.
International Search Report, dated Aug. 29, 2017 from the International Bureau in counterpart International application No. PCT/JP2017/021356.
Chinese Office Action for CN Application No. 201780046911.X dated May 11, 2021 with English Translation.
Extended European Search Report for EP Application No. EP17833863.8 dated Jan. 2, 2020.
U.S. Office Action for U.S. Appl. No. 16/321,487 dated Oct. 29, 2021.
United States Office Communication for U.S Appl. No. 16/321,487 dated Feb. 3, 2022.

* cited by examiner

MOVING OBJECT OPERATION SYSTEM, OPERATION SIGNAL TRANSMISSION SYSTEM, MOVING OBJECT OPERATION METHOD, PROGRAM, AND RECORDING MEDIUM

This application is a National Stage Entry of PCT/JP2017/014085 filed on Apr. 4, 2017, which claims priority from Japanese Patent Application 2016-150570 filed on Jul. 29, 2016, the contents of all of which are incorporated herein by reference, in their entirety.

TECHNICAL FIELD

The present invention relates to a moving object operation system, an operation signal transmission system, a moving object operation method, a program, and a recording medium.

BACKGROUND ART

Among unmanned flight vehicles operated by remote control, drones have been attempted to be used for various services in recent years. In addition, drones have become easy to obtain as household toys. A so-called proportional type controller is used for the operation of the drone, and the motor of the drone is controlled by moving two sticks mounted on the controller, thereby controlling the movement of the drone (Non Patent Literature 1). However, the operation of the drone is extremely difficult. In fact, sufficient practice must be carried out in order to safely operate the drone.

CITATION LIST

Non Patent Literature

Non Patent Literature 1: "Scalable Autonomy Concept for Reconnaissance UAVs on the Basis of an HTN Agent Architecture", 2016 International Conference on Unmanned Aircraft Systems (ICUAS), Jun. 7-10, 2016.

SUMMARY OF INVENTION

Technical Problem

Hence, the present invention is intended to provide a new system that allows an easier operation of an unmanned flight vehicle such as a drone operated by remote control.

Solution to Problem

In order to achieve the above object, the present invention provides a moving object operation system including: a moving object; and an operation signal transmitter for the moving object. The moving object includes a signal receipt unit that receives an operation signal from the operation signal transmitter. The operation signal transmitter includes: an auxiliary tool; a storage unit that contains conversion information; a movement information acquisition unit that acquires auxiliary tool movement information associated with motion of an operator, with the auxiliary tool at a predetermined position as a reference point; a conversion unit that converts the acquired movement information into the operation signal to the moving object based on the conversion information; and a signal transmission unit that transmits the operation signal to the moving object. The conversion information includes auxiliary tool movement information associated with human motion and operation signal information for instructing the moving object in how to move, and the auxiliary tool movement information and the operation signal information are associated with each other. The auxiliary tool movement information associated with human motion is auxiliary tool movement information associated with human motion imagining movement of the moving object, with the auxiliary tool at a predetermined position as a reference point.

The present invention also provides an operation signal transmission system for a moving object, including: an auxiliary tool; a storage unit that contains conversion information; a movement information acquisition unit that acquires auxiliary tool movement information associated with motion of an operator, with the auxiliary tool at a predetermined position as a reference point; a conversion unit that converts the acquired movement information into an operation signal to a moving object based on the conversion information; and a signal transmission unit that transmits the operation signal to the moving object. The conversion information includes auxiliary tool movement information associated with human motion, moving object movement information, and operation signal information for instructing the moving object in how to move, and the auxiliary tool movement information, the moving object movement information, and the operation signal information are associated with one another. The auxiliary tool movement information associated with human motion is auxiliary tool movement information associated with human motion imagining movement of the moving object, with the auxiliary tool at a predetermined position as a reference point.

The present invention also provides a moving object operation method using a moving object and the operation signal transmission system according to the present invention, including the steps of: acquiring auxiliary tool movement information associated with motion of an operator, with the auxiliary tool at a predetermined position as a reference point, by the system; converting the acquired movement information into the operation signal to the moving object based on the conversion information by the system; transmitting the operation signal to the moving object by the system; and receiving the transmitted operation signal by the moving object. The conversion information includes auxiliary tool movement information associated with human motion and operation signal information for instructing the moving object in how to move, and the auxiliary tool movement information and the operation signal information are associated with each other. The auxiliary tool movement information associated with human motion is auxiliary tool movement information associated with human motion imagining movement of the moving object, with the auxiliary tool at a predetermined position as a reference point.

The present invention also provides a program that can execute the moving object operation method of the present invention on a computer.

The present invention also provides a computer-readable recording medium recorded with the program of the present invention.

Advantageous Effects of Invention

According to the present invention, an easier operation of a moving object can be achieved.

DESCRIPTION OF EMBODIMENTS

Figure 1:
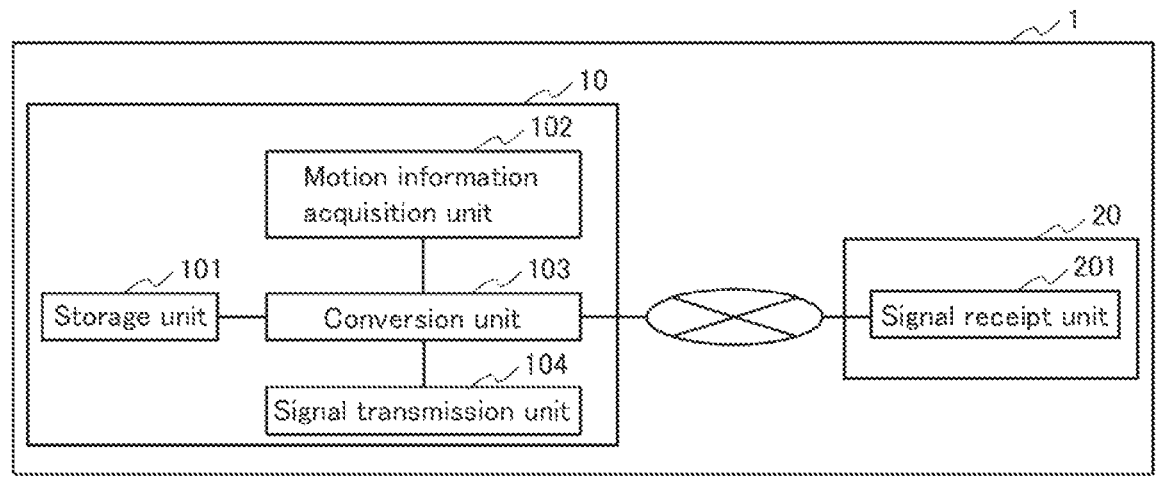
FIG. 1 is a block diagram showing an example of the moving object operation system according to the first example embodiment of the present invention.

In the moving object operation system of the present invention, for example, the auxiliary tool movement information associated with human motion is auxiliary tool movement information associated with motion of simulating the movement of the moving object with a human body, with the auxiliary tool at a predetermined position as a reference point.

In the moving object operation system of the present invention, for example, the auxiliary tool is connected to a support, at least one point of which is fixed, and the auxiliary tool is movable with the fixed point of the support as a reference point.

In the moving object operation system of the present invention, for example, the moving object is a flight vehicle.

In the moving object operation system of the present invention, for example, the flight vehicle is a drone.

In the moving object operation system of the present invention, for example, the auxiliary tool movement information associated with human motion includes a type of movement and a degree of movement, the moving object movement information includes a type of movement and a degree of movement, and the operation signal information includes a type of movement to be instructed and a degree of movement to be instructed.

In the moving object operation system of the present invention, for example, the operation signal transmitter further includes: a sound information acquisition unit that acquires human sound (voice) information. The conversion unit converts the acquired sound information into the operation signal to the moving object based on the conversion information. The conversion information further includes human sound information, and the sound information and the operation signal information are associated with each other.

In the moving object operation system of the present invention, for example, the moving object further includes: an image information acquisition unit that acquires image information; and an image information transmission unit that transmits the acquired image information to the operation signal transmitter, and the operation signal transmitter further includes: an image information receipt unit that receives the image information transmitted from the moving object; and a display unit that displays the image information.

In the moving object operation system of the present invention, for example, the image information acquisition unit of the moving object is a camera.

In the moving object operation system of the present invention, for example, the display unit of the operation signal transmitter is a human wearable display.

In the moving object operation system of the present invention, for example, the operation signal transmitter further includes: a position prediction unit that predicts a position of the moving object after a predetermined period of time based on the image information received by the image information receipt unit, and the display unit displays the image information received by the image information receipt unit and the predicted position information obtained by the position prediction unit.

In the operation signal transmission system of the present invention, for example, the auxiliary tool movement information associated with human motion is auxiliary tool movement information associated with motion of simulating the movement of the moving object with a human body, with the auxiliary tool at a predetermined position as a reference point.

In the operation signal transmission system of the present invention, for example, the auxiliary tool is connected to a support, at least one point of which is fixed, and the auxiliary tool is movable with the fixed point of the support as a reference point.

In the operation signal transmission system of the present invention, for example, the moving object is a flight vehicle.

In the operation signal transmission system of the present invention, for example, the flight vehicle is a drone.

In the operation signal transmission system of the present invention, for example, the auxiliary tool movement information associated with human motion includes a type of movement and a degree of movement, the moving object movement information includes a type of movement and a degree of movement, and the operation signal information includes a type of movement to be instructed and a degree of movement to be instructed.

The operation signal transmission system of the present invention further includes a sound information acquisition unit that acquires human sound information, for example. The conversion unit converts the acquired sound information into the operation signal to the moving object based on the conversion information. The conversion information further includes human sound information, and the sound information and the operation signal information are associated with each other.

The operation signal transmission system of the present invention further includes an image information receipt unit that receives the image information transmitted from the moving object; and a display unit that displays the image information, for example.

In the operation signal transmission system of the present invention, for example, the display unit is a human wearable display.

The operation signal transmission system of the present invention includes an information acquisition terminal; and a server, for example. The terminal and the server are connectable via a communication network. The terminal includes: the movement information acquisition unit. The server includes: the storage unit; the conversion unit; and the signal transmission unit.

In the operation signal transmission system of the present invention, for example, the information acquisition terminal further includes the sound information acquisition unit.

The operation signal transmission system of the present invention further includes a display terminal, for example. The display terminal includes: the image information receipt unit; and the display unit.

The operation signal transmission system of the present invention further includes a position prediction unit that predicts a position of the moving object after a predetermined period of time based on the image information received by the image information receipt unit. The display unit displays the image information received by the image information receipt unit and the predicted position information obtained by the position prediction unit.

In the moving object operation method of the present invention, for example, the auxiliary tool movement information associated with human motion is auxiliary tool movement information associated with motion of simulating the movement of the moving object with a human body, with the auxiliary tool at a predetermined position as a reference point.

In the moving object operation method of the present invention, for example, the auxiliary tool is connected to a support, at least one point of which is fixed, and the auxiliary tool is movable with the fixed point of the support as a reference point.

In the moving object operation method of the present invention, for example, the moving object is a flight vehicle.

In the moving object operation method of the present invention, for example, the flight vehicle is a drone.

In the moving object operation method of the present invention, for example, the auxiliary tool movement information associated with human motion includes a type of movement and a degree of movement, the moving object movement information includes a type of movement and a degree of movement, and the operation signal information includes a type of movement to be instructed and a degree of movement to be instructed.

The moving object operation method of the present invention further includes the step of: acquiring human sound information by the system, for example. The acquired sound information is converted into the operation signal to the moving object based on the conversion information in the conversion step. The conversion information further includes human sound information, and the sound information and the operation signal information are associated with each other.

The moving object operation method of the present invention further includes the steps of: acquiring image information by the moving object; transmitting the acquired image information to the system by the moving object; receiving the image information transmitted from the moving object by the system; and displaying the image information by the system.

In the moving object operation method of the present invention, for example, image information is acquired by a camera in the image information acquisition step.

In the moving object operation method of the present invention, for example, the image information is displayed on a human wearable display in the display step.

The moving object operation method of the present invention further includes the step of: predicting a position of the moving object after a predetermined period of time based on the image information received by the system in the image information receipt step, for example. The image information received in the image information receipt step and the predicted position information obtained in the position prediction step are displayed in the display step.

The example embodiments of the present invention are described below with reference to the drawings. It is to be noted, however, that the present invention is by no means limited or restricted by the following example embodiments. In the following drawings, identical parts are indicated with identical reference signs. Regarding the descriptions of the example embodiments, reference can be made to one another unless otherwise stated. Furthermore, the configurations of the example embodiments can be combined unless otherwise stated.

First Example Embodiment

The first example embodiment relates to a moving object operation system, an operation signal transmission system, and a moving object operation method of the present invention.

FIG. 1 shows a block diagram of a moving object operation system according to the present example embodiment. As shown in FIG. 1, a moving object operation system 1 of the present example embodiment includes an operation signal transmitter 10 and a moving object 20. The operation signal transmitter 10 and the moving object 20 are connectable via a communication network.

The moving object 20 is, for example, an unmanned flight vehicle operated by remote control, and may be a flight vehicle. The flight vehicle may be, for example, an unmanned flight vehicle with a rotary wing such as a helicopter. The helicopter may be, for example, a multicopter such as a quadricoptoer. Specifically, the multicopter such as a quadricoptoer or the like may be, for example, a so-called drone. Examples of the flight vehicle besides the drone include radio operated flight vehicles such as a balloon, an airship, a variable-wing aircraft (VTOL), a fixed-wing aircraft, and a multiple-wing aircraft (e.g., an Amazon Air). The moving object may be, for example, a remote vehicle such as a throttle-automobile.

The moving object 20 includes a signal receipt unit 201. The signal receipt unit 201 is, for example, a central processing unit (CPU) or the like.

In the present example embodiment, the operation signal transmitter 10 is the auxiliary tool, and the auxiliary tool (i.e., operation signal transmitter 10) includes a storage unit 101, a movement information acquisition unit 102, a conversion unit 103, and a signal transmission unit 104. In other words, in the present example embodiment, the operation signal transmitter 10 may be, for example, an apparatus (terminal) that includes the auxiliary tool, the storage unit 101, the movement information acquisition unit 102, the conversion unit 103, and the signal transmission unit 104 as one piece, or may be a system.

The operation signal transmitter 10, which is the auxiliary tool, includes a storage unit 101, a movement information acquisition unit 102, a conversion unit 103, and a signal transmission unit 104 as described above. The conversion unit 103 and the signal transmission unit 104 may be installed, for example, in a data processing unit (data processing device), which is hardware or may be software or hardware in which the software is installed. The data processing unit may include a central processing unit (CPU) or the like. In the moving object operation system 1 of the present example embodiment, the storage unit 101 and the movement information acquisition unit 102 are electrically connected to the conversion unit 103, and the conversion unit 103 is electrically connected to the signal transmission unit 104. In the moving object operation system 1 of the present example embodiment, for example, any one or more units may be separated.

The auxiliary tool (i.e., the operation signal transmitter 10 in the present example embodiment) is, for example, a terminal, and specific examples thereof include cellular phones, smartphones, and tablets.

The storage unit 101 contains conversion information. Examples of the storage unit 101 include random access memories (RAMs), read only memories (ROMs), flash memories, hard disks (HDs), optical disks, and Floppy® disks (FDs). The storage unit 101 may be a built-in type or an external type such as an external storage device.

The movement information acquisition unit 102 acquires auxiliary tool movement information associated with motion of an operator, with the auxiliary tool at a predetermined position as a reference point. The movement information acquisition unit 102 is, for example, a sensor mounted on the auxiliary tool and detecting the movement of the auxiliary tool. Examples of the sensor include gyro sensors, and acceleration sensors.

The type of movement information obtained by the movement information acquisition unit 102 is not particularly limited, and may be, for example, information on the movement of the auxiliary tool in two or three dimensions, with the auxiliary tool at a predetermined position as a reference point. In this instance, it is preferable that the auxiliary tool is connected to a support, for example. Furthermore, it is preferable that at least one point of the support is fixed to, for example, the ground, and the auxiliary tool connected to the support is movable, for example, with the fixed point of the support as a reference point. Such a configuration allows to easily acquire the auxiliary tool movement information associated with motion of an operator with the fixed point as a reference point.

The conversion information includes auxiliary tool movement information associated with human motion and operation signal information for instructing the moving object in how to move, and the auxiliary tool movement information and the operation signal information are associated with each other. The auxiliary tool movement information associated with human motion is auxiliary tool movement information associated with human motion imagining movement of the moving object, with the auxiliary tool at a predetermined position as a reference point. For example, the auxiliary tool movement information associated with human motion is auxiliary tool movement information associated with motion of simulating the movement of the moving object with a human body, with the auxiliary tool at a predetermined position as a reference point. The auxiliary tool movement information associated with human motion includes, for example, a type of movement. The moving object movement information includes, for example, a type of movement.

The conversion information is described below with reference to a case in which the moving object is a flight vehicle such as a drone or the like as a specific example. The drone is operated by controlling the motor of each propeller by two sticks of the controller as described above. The movement (throttle, pitch, roll, ladder, or the like) of the motor controls the movement of the drone such as front to back and side to side traveling, swivel, stop, or the like. That is, the motion of the operator in the conventional drone operation is the motion of the fingers operating the controller. On the other hand, although a human cannot fly using his or her body, people have a common potential image of motion (e.g., body posture, pose, and the like) of flying using the body, which is based on movies, picture books, comics, animations, and the like, for example. Thus, for example, each motion for operation of a flight vehicle imagined by a person can be associated with each movement of the drone. Hence, in the present invention, auxiliary tool movement information associated with human motion of imagining the movement of a drone while holding an auxiliary tool and an operation signal for instructing the movement corresponding thereto to the drone are associated with each other, thereby obtaining conversion information. This allows an operator to operate a drone more easily than the operation with a controller because, by taking the motion of imagining the movement of a drone while holding the auxiliary tool, the motion is converted into the associated operation signal information. In the case of a conventional controller, for example, delicate movements of two sticks and the combinations of the movements must be memorized, which makes an operation extremely difficult. In contrast, motion for operation of a flight vehicle potentially imagined is easy for an operator to memorize, and the body tends to react naturally even when quick judgments need to be made, thereby achieving an easier operation.

Regarding the conversion information, the combination of the auxiliary tool movement information associated with human motion and the movement of the moving object associated therewith is not particularly limited, and can be appropriately set according to the attribute of the operator, for example. Examples of the attribute include "child", "adult", "woman", "man", "beginner", and "experienced individual". The conversion information can be obtained, for example, by systematizing the movement of the moving object and the motion image common in the predetermined attribute while holding the auxiliary tool. As a specific example, when the attribute is "child", for example, the conversion information for each movement of the moving object can be set by collecting potential motion images of children, selecting common motion images, and systematizing each movement of the moving object and a motion image corresponding thereto.

Figure 2:
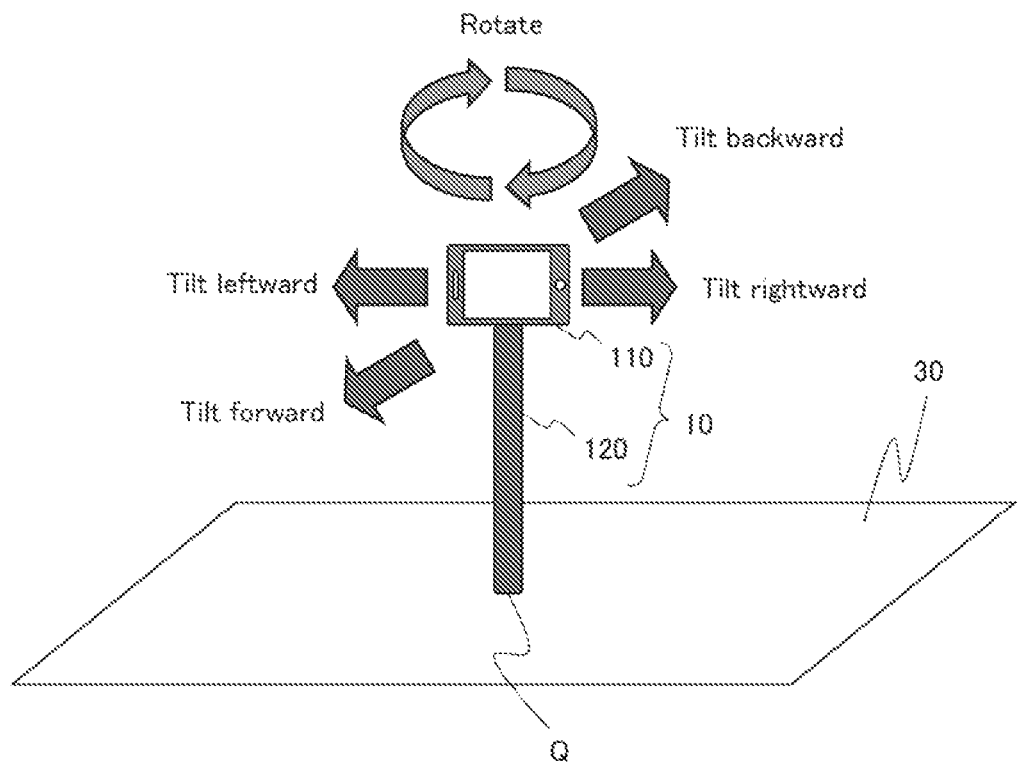
FIG. 2 is a schematic view showing an example of auxiliary tool movement information associated with human motion in the first example embodiment of the present invention.

FIG. 2 shows the relationship between the auxiliary tool movement information associated with human motion and the movement of a moving object associated therewith. FIG. 2 is merely for illustrative proposes and does not limit the present invention. In the example shown in FIG. 2, the operation signal transmitter 10 includes an auxiliary tool 110 and a support 120, and the auxiliary tool 110 includes a storage unit 101, a movement information acquisition unit 102, a conversion unit 103, and a signal transmission unit 104. The auxiliary tool 110 is a smartphone. In FIG. 2, a person who operates the auxiliary tool 2 stands in front of the drawing plane and faces the drawing plane. The auxiliary tool 110 is rotatably connected to the other end of the rod-shaped support 120 whose one end Q is fixed to the ground 30, and can be tilted forward, backward, leftward, and rightward or rotated with the fixed point Q as a reference point as shown in FIG. 2. As shown in FIG. 2, for example, a state in which the operator holding the auxiliary tool 110 tilts the auxiliary tool 110 backward corresponds to the forward movement of the moving object, a state in which the operator tilts the auxiliary tool 110 forward corresponds to the backward movement of the moving object, a state in which the operator tilts the auxiliary tool 110 rightward corresponds to the right turn of the moving object, and a state in which the operator tilts the auxiliary tool 110 leftward corresponds to the left turn of the moving object. Regarding the "backward and forward" as the directions of tilting the auxiliary tool 10, the operator side with reference to the auxiliary tool 110 is referred to as "front" and the side opposite to the operator is referred to as "back". The present invention, however, is not limited thereto, and the back of the auxiliary tool 110 with reference to the operator can be referred to as the front for the operator, and the front of the auxiliary tool 10 with reference to the operator can be referred to as the back for the operator, and can be read interchangeably.

Preferably, the auxiliary tool movement information associated with human motion further includes the degree of motion in addition to the type of motion, for example, the moving object movement information further includes the degree of movement in addition to the type of movement, for example, and the operation signal information includes the type of movement to be instructed and the degree of movement to be instructed. That is, it is preferable to associate the weight of the degree of auxiliary tool movement with the weight of the degree of moving object movement by weighting the degree of the auxiliary tool movement associated with human motion. This allows control of not only the type of movement but also the magnitude, speed, and the like of the movement, for example. As a specific example, in FIG. 2, in the case where the operator tilts auxiliary tool 110 backward to move the moving object forward, the moving object can be moved forward at a higher speed by tilting the auxiliary tool 110 further backward.

The conversion unit 103 converts the acquired movement information into the operation signal to the moving object based on the conversion information. The conversion unit 103 may be, for example, the CPU or the like.

The signal transmission unit 104 transmits the operation signal to the moving object. The signal transmission unit 104 may be, for example, the CPU or the like.

The moving object 20 includes the signal receipt unit 201 and the signal receipt unit 201 receives an operation signal from the operation signal transmitter 10. The signal receipt unit 201 may be, for example, the CPU.

The moving object 20 is not particularly limited. The moving object 20 may be, for example, a flight vehicle such as a drone.

Figure 3:
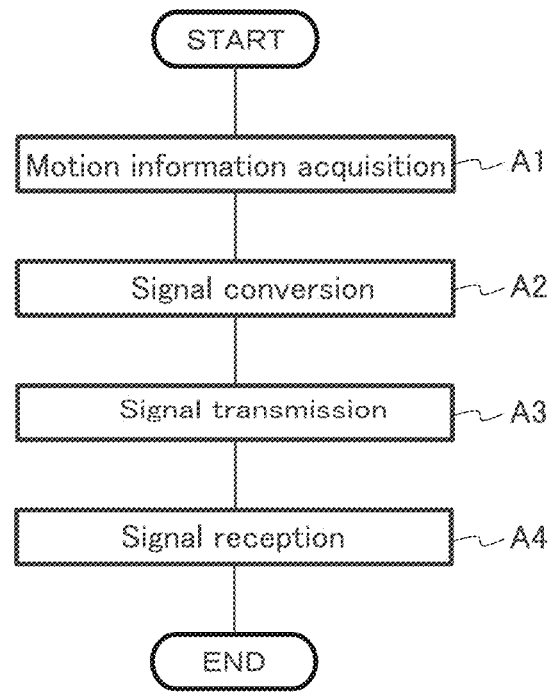
FIG. 3 is a flowchart showing an example of the moving object operation method according to the first example embodiment of the present invention.

FIG. 3 shows a flowchart of the moving object operation method according to the present example embodiment. The moving object operation method of the present example embodiment is performed as follows, for example, using the moving object operation system of FIG. 1. As shown in FIG. 3, the moving object operation method of the present example embodiment includes a step A1 (movement information acquisition), a step A2 (signal conversion), a step A3 (signal transmission), and a step A4 (signal reception).

First, the conversion information is prepared prior to the step A1. As the conversion information, for example, conversion information corresponding to the attribute of the operator can be selected as described above.

(A1) Movement Information Acquisition

In the step A1, the auxiliary tool movement information associated with motion of an operator is acquired by detecting the auxiliary tool movement associated with the motion of the operator.

(A2) Signal Conversion

In the step A2, the movement information is converted into the operation signal to the moving object based on the conversion information.

(A3) Signal Transmission

In the step A3, the converted operation signal is transmitted from the operation signal transmitter 10 to the moving object 20.

(A4) Signal Reception

In the step A4, the moving object 20 receives the operation signal from the operation signal transmitter 10. Then, the movement of the moving object 20 is controlled according to the operation signal.

In the moving object operation system, the operation signal transmission system, and the moving object operation method according to the present example embodiment, the auxiliary tool movement information associated with human motion imagining the movement of the moving object, with the auxiliary tool at a predetermined position as a reference point, is converted into the operation signal to the moving object to operate the moving object. This allows an easier operation. The same effects as these can be obtained also in the example embodiments described below.

(Variation 1)

As to the present example embodiment, a variation of the operation signal transmitter 10 is described below. In the present invention, the operation signal transmitter 10 is not limited to the form of one terminal (auxiliary tool) as described above, and may be, for example, a system. As a specific example, the operation signal transmitter 10 may be a system in which two independent terminals are connectable via a communication network. In this case, for example, one terminal is the auxiliary tool including the movement information acquisition unit 102 and the other terminal includes a storage unit 101, a conversion unit 103 and a signal transmission unit 104. An example of this variation is shown in FIG. 4.

Figure 4:
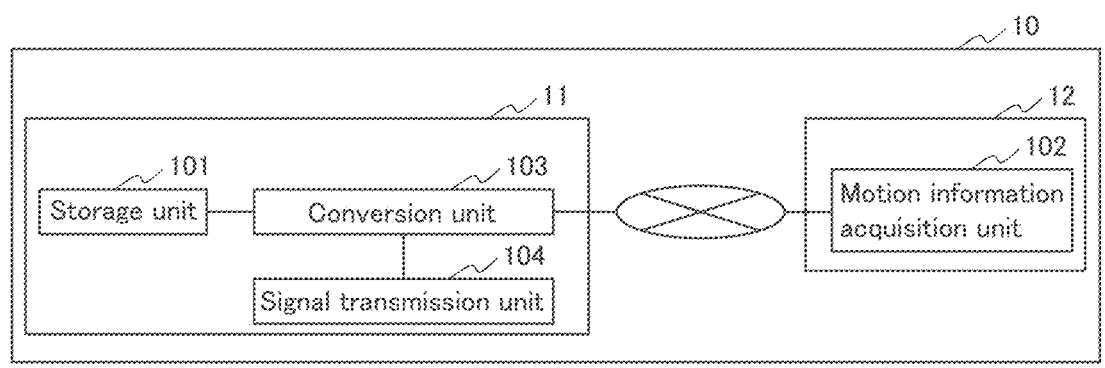
FIG. 4 is a block diagram showing an example of the operation signal transmission system according to the first example embodiment of the present invention.

FIG. 4 is a block diagram of the system showing an example in which the operation signal transmitter 10 is an operation signal transmission system. As shown in FIG. 4, the operation signal transmission system 10 includes a main body 11 and a terminal 12, and the main body 11 and the terminal 12 are connectable via a wired or wireless communication network. The main body 11 includes the storage unit 101, the conversion unit 103, and the signal transmission unit 104. In the main body 11, the storage unit 101 is electrically connected to the conversion unit 103, and the conversion unit 103 is electrically connected to the signal transmission unit 104. The terminal 12 is an information acquisition terminal, i.e., the auxiliary tool, and includes the movement information acquisition unit 102.

(Variation 2)

As to the present example embodiment, a variation relating to acquisition of the auxiliary tool movement by the movement information acquisition unit is described below. As described above, although FIGS. 1 and 4 each show the case in which the terminal, which is an auxiliary tool, itself includes the movement information acquisition unit 102 for detecting the movement of the terminal, for example, the auxiliary tool and the movement information acquisition unit may be separate terminals. In this case, the movement information acquisition unit may be, for example, a sensor for detecting the movement of the terminal (auxiliary tool) 12 from the outside. Examples of the sensor include motion capture sensors such as KINECT® produced by Microsoft Corporation and Perception Neuron produced by Noitom Ltd. In this variation, the type of the movement information obtained by the movement information acquisition unit 102 is not particularly limited, and examples thereof include movement images such as two-dimensional or three-dimensional images, two-dimensional or three-dimensional movement sensor data acquired by the sensor or the like, and movement analysis data analyzed by a movement analysis table or the like.

The movement information acquisition unit 102 may acquire auxiliary tool-surrounding information, i.e., motion information of the operator, in addition to the auxiliary tool movement information associated with motion of an operator, for example. The motion information of the operator can be added to the auxiliary tool movement information associated with human motion, for example.

Second Example Embodiment

The second example embodiment relates to an aspect in which the moving object operation system of the present invention further includes a sound information acquisition unit and a sound information acquisition step. Regarding the present example embodiment, reference can be made to the description of the first example embodiment.

Figure 5:
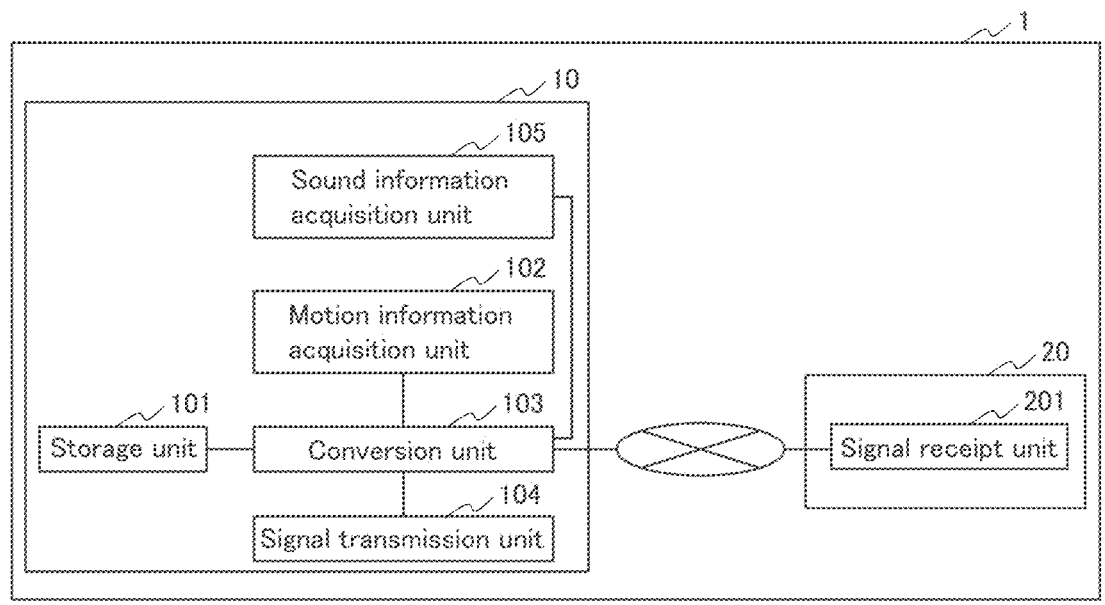
FIG. 5 is a block diagram showing an example of the moving object operation system according to the second example embodiment of the present invention.

FIG. 5 is a block diagram showing the moving object operation system according to the present example embodiment. As shown in FIG. 5, in the moving object operation system 1 of the present example embodiment, the operation signal transmitter 10, which is an auxiliary tool, further includes a sound information acquisition unit 105.

Figure 6:
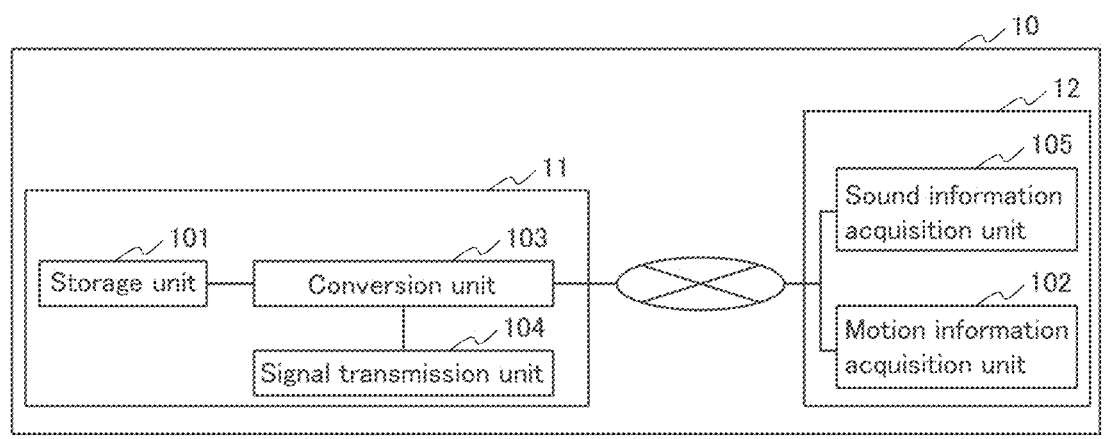
FIG. 6 is a block diagram showing an example of the operation signal transmission system according to the second example embodiment of the present invention.

The operation signal transmitter 10 may be an operation signal transmission system as described above. FIG. 6 shows a block diagram of the system. As shown in FIG. 6, the operation signal transmission system 10 includes the main body 11 and the terminal 12, and the main body 11 and the terminal 12 are connectable via a wired or wireless communication network. The main body 11 includes the storage unit 101, the conversion unit 103, and the signal transmission unit 104. In the main body 11, the storage unit 101 is electrically connected to the conversion unit 103, and the conversion unit 103 is electrically connected to the signal transmission unit 104. The terminal 12 is an information acquisition terminal, i.e., an auxiliary tool, and includes the movement information acquisition unit 102 and the sound information acquisition unit 105. In the operation signal transmission system, for example, the movement information acquisition unit 102 and the sound information acquisition unit 105 may be separate terminals, and each ma be connectable to the main body 11 via the communication network.

The sound information acquisition unit 105 acquires sound information of an operator. The sound information acquisition unit 105 is, for example, the terminal 12 as described above. As a specific example, the sound information acquisition unit 105 may be a sound recognizing device such as a microphone or the like. The type of the sound information obtained by the sound information acquisition unit 105 is not particularly limited, and examples thereof include sound data and sound analysis data analyzed by a sound analysis table or the like.

The conversion information of the storage unit 101 further includes human sound information, and the sound information and the operation signal information are associated with each other. Examples of the sound information include sound information denoting the type of motion and sound information indicating the degree of motion. The former sound information denoting the type of motion includes, for example, "watch out", "stop", and the like, which instruct the moving object to stop. The latter sound information indicating the degree of motion includes, for example, "less", "more", and the like, which instruct the moving object the degree of the movement; and "faster", "slower", and the like, which instruct the moving object the speed of the movement.

Figure 7:
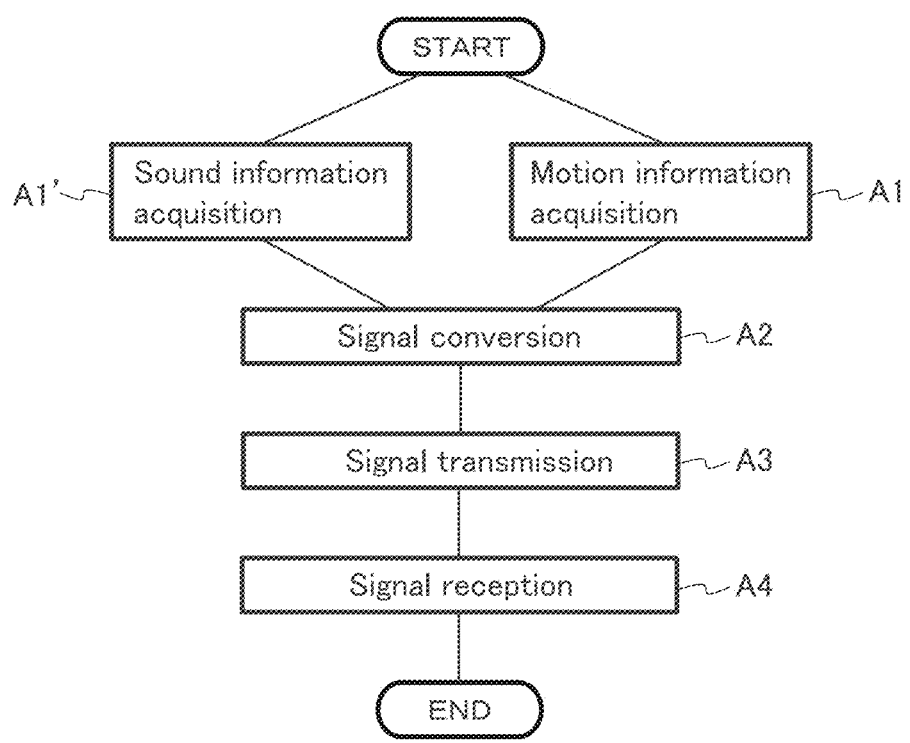
FIG. 7 is a flowchart showing an example of the moving object operation method according to the second example embodiment of the present invention.

Next, FIG. 7 shows a flowchart of the moving object operation method according to the present example embodiment. The moving object operation method of the present example embodiment is performed as follows using, for example, the moving object operation system of FIG. 5. As shown in FIG. 7, the moving object operation method of the present example embodiment includes the step A1 (movement information acquisition), a step A1' (sound information acquisition), the step A2 (signal conversion), the step A3 (signal transmission), and the step A4 (signal reception).

First, the conversion information is prepared prior to the step A1. As the conversion information, for example, conversion information corresponding to the attribute of the operator can be selected as described above.

(A1) Movement Information Acquisition

In the step A1, the auxiliary tool movement information associated with motion of an operator is acquired by detecting the auxiliary tool movement associated with the motion of the operator.

(A1') Sound Information Acquisition

In the step A1', the sound information of the operator is acquired by detecting the sound (voice) of the operator in parallel with the step A1.

(A2) Signal Conversion

In the step A2, the movement information and the sound information are converted into an operation signal to the moving object based on the conversion information.

(A3) Signal Transmission

In the step A3, the converted operation signal is transmitted from the operation signal transmitter 10 to the moving object 20.

(A4) Signal Reception

In the step A4, the moving object 20 receives the operation signal from the operation signal transmitter 10. Then, the movement of the moving object 20 is controlled according to the operation signal.

The moving object operation system, the operation signal transmission system, and the moving object operation method according to the present example embodiment each further allow the sound information of the operator to be converted into the operation signal to the moving object to operate the moving object. This allows a finer movement instruction, a prompt movement instruction, and the like. The same effects as these can be obtained also in the example embodiments described below.

Third Example Embodiment

The third example embodiment relates to an aspect in which the moving object operation system of the present invention further includes an image information receipt unit and a display unit, and an image information receipt step and a display step. Regarding the present example embodiment, reference can be made to the descriptions of the first and second example embodiments.

Figure 8:
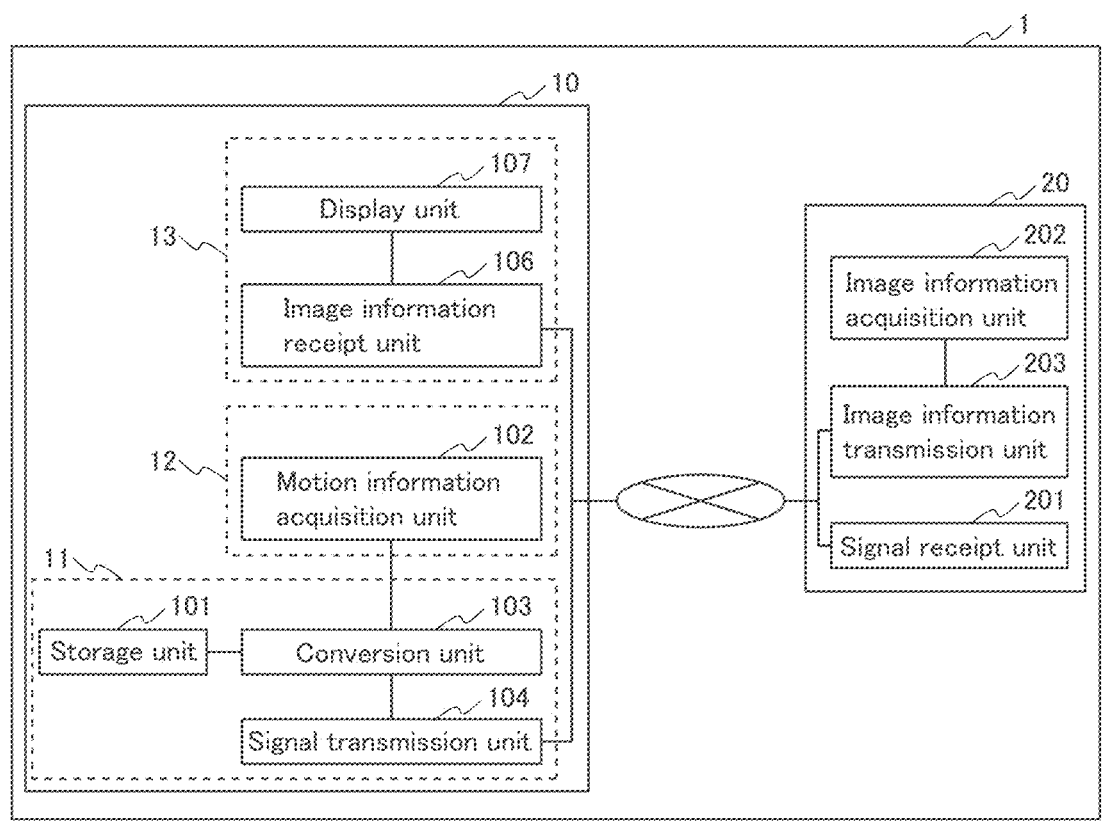
FIG. 8 is a block diagram showing an example of the moving object operation system according to the third example embodiment of the present invention.

FIG. 8 shows a block diagram of the moving object operation system according to the present example embodiment. As shown in FIG. 8, in the moving object operation system 1 of the present example embodiment, the operation signal transmitter 10 further includes an image information receipt unit 106 and a display unit 107, and the moving object 20 further includes an image information acquisition unit 202 and an image information transmission unit 203.

The image information acquisition unit 202 acquires image information. The image information is, for example, a moving image (video). The image information acquisition unit 202 may be, for example, a camera, and is mounted on the main body of the moving object 20. The camera may be, for example, a camera for shooting one direction. The camera may be, for example, a camera for shooting one direction, which may be rotatable by 360°. The camera is mounted on the moving object 20 in the state of shooting the front direction, for example. Alternatively, the camera may be, for example, a 360° camera for shooting an omnidirectional image at once. In the case of a 360° camera, for example, an omnidirectional image can be acquired without rotating the camera.

The image information transmission unit 203 transmits the image information acquired by the image information acquisition unit 202 to the operation signal transmitter 10. The image information transmission unit 203 may be a CPU or the like.

The image information receipt unit 106 receives the image information transmitted from the moving object 20. The image information receipt unit 106 may be, for example, a CPU or the like.

The display unit 107 displays the received image information. The display unit 107 may be, for example, a monitor for outputting images, and specific examples thereof include various image display apparatuses such as liquid crystal displays (LCDs), cathode ray tube (CRT) displays, and the like. The display unit may be, for example, a display unit provided in the auxiliary tool.

In this case, examples of the terminal 13 including the display unit 107 includes the above described auxiliary tools such as smartphones and tablets.

The terminal 13 including the display unit 107 may be, for example, a human wearable display. Specifically, the terminal 13 including the display unit 107 may be, for example, a head mounted display or the like. When the display unit 107 is the wearable display, for example, the display unit 107 may also serve as a movement information acquisition unit (hereinafter, also referred to as the second movement information acquisition unit) that acquires motion information of an operator besides the movement information acquisition unit 102 that acquires the auxiliary tool movement information. In this case, the second movement information acquisition unit acquires, for example, the movement of the face of the operator wearing the second movement information acquisition unit as the human motion information.

Figure 9:
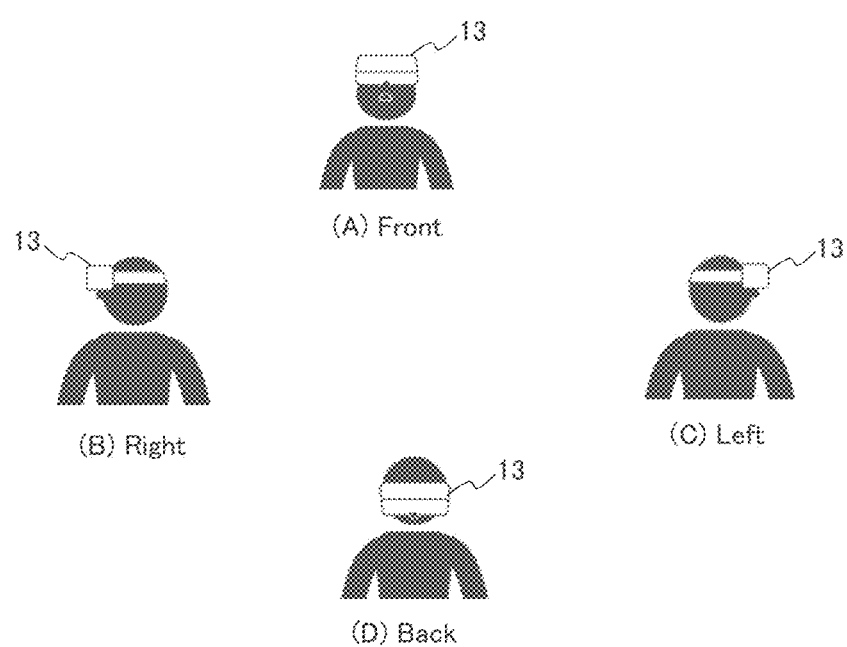
FIG. 9 is a schematic view showing an example of human motion information in the third example embodiment of the present invention.

When the display unit 107 is the wearable display and the image information acquisition unit 202 is a camera for shooting one direction, it is preferable that, for example, the moving direction of the moving object is identical to the direction of the image displayed on the display unit 107. When the display unit 107 also serves as the second movement information acquisition unit, for example, the movement of the display unit 107 made by the operator and the orientation of the camera in the moving object 20 can be interlocked with each other. Therefore, for example, the orientation of the face of the operator (the orientation of the operator's view) and the orientation of the camera can be interlocked. FIG. 9 shows the relationship between the human motion information and the movement of the camera of the moving object 20 associated therewith. FIG. 9 is merely for illustrative purposes and does not limit the present invention. As shown in FIG. 9, when the operator wearing the terminal 13 including the display 107 faces front (A), the shooting direction of the camera of the moving object 20 is the front direction, when the operator faces right (B), the shooting direction of the camera of the moving object 20 is the right direction, when the operator faces left (C), the shooting direction of the camera of the moving object 20 is the left direction, and when the operator faces down (D), the shooting direction of the camera of the moving object 20 is the downward direction.

In the present example embodiment, the storage unit may further include human motion information as the conversion information. The human motion information is, for example, motion information of a person with a predetermined direction as a reference point, and specifically, information of the orientation of the face with the face of the person facing the front as a reference point. In addition, it is preferable that, for example, the human motion information (e.g., the orientation of the face) is associated with the operation signal information for instructing the moving object the orientation thereof. The present example embodiment is described below with reference to the combination of the movement information acquisition unit (auxiliary tool) 102 shown in FIG. 2 and the second movement information acquisition unit (wearable display) as an example. The operator wears the second movement information acquisition unit (wearable display) and operate the moving object while holding the auxiliary tool. In this case, the operator can move the moving object forward by facing front and tilting the terminal 12 backward, the operator can move the moving object upward by facing up and tilting the terminal 12 backward, the operator can curve the moving object to the right by facing front and tilting the terminal 12 to the right, and the operator can horizontally move the moving object to the right by facing right and tilting the terminal 12 to the right.

Figure 10:
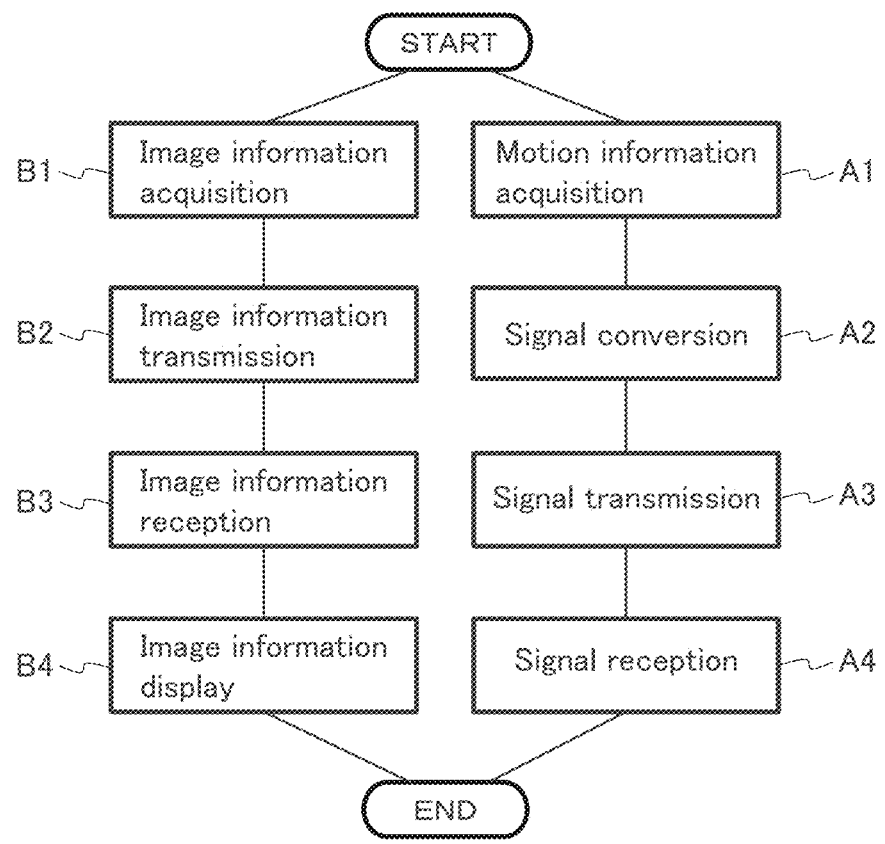
FIG. 10 is a flowchart showing an example of the moving object operation method according to the third example embodiment of the present invention.

FIG. 10 shows a flowchart of the moving object operation method according to the present example embodiment. The moving object operation method of the present example embodiment is performed as follows using, for example, the moving object operation system of FIG. 8. As shown in FIG. 10, the moving object operation method of the present example embodiment includes the step A1 (movement information acquisition), the step A2 (signal conversion), the step A3 (signal transmission), the A4 (signal reception), a step B1 (image information acquisition), a step B2 (image information transmission), a step B3 (image information reception), and a step B4 (image information display).

In the flowchart, the steps A1 to A4 are the same as in the example embodiments described above, and the steps B1 to B4 are performed in parallel with the steps A1 to A4.

(B1) Image Information Acquisition

In the step B1, the image information is acquired by the moving object 20.

(B2) Image Information Transmission

In the step B2, the image information acquired by the moving object 20 is transmitted to the operation signal transmitter 10.

(B3) Image Information Reception

In the step B3, the operation signal transmitter 10 receives the image information transmitted from the moving object 20.

(B4) Image Information Display

In the step B4, the image information received by the operation signal transmitter 10 is displayed.

Fourth Example Embodiment

The fourth example embodiment relates to as aspect in which a predicted future position of the moving object is further displayed on the display unit. More specifically, the fourth example embodiment relates to an aspect in which the moving object operation system of the present invention further includes a position prediction unit and a position prediction step. The present example embodiment is the same as the third example embodiment unless otherwise stated, and reference can be made to the descriptions of the first, second, and third example embodiments.

Figure 11:
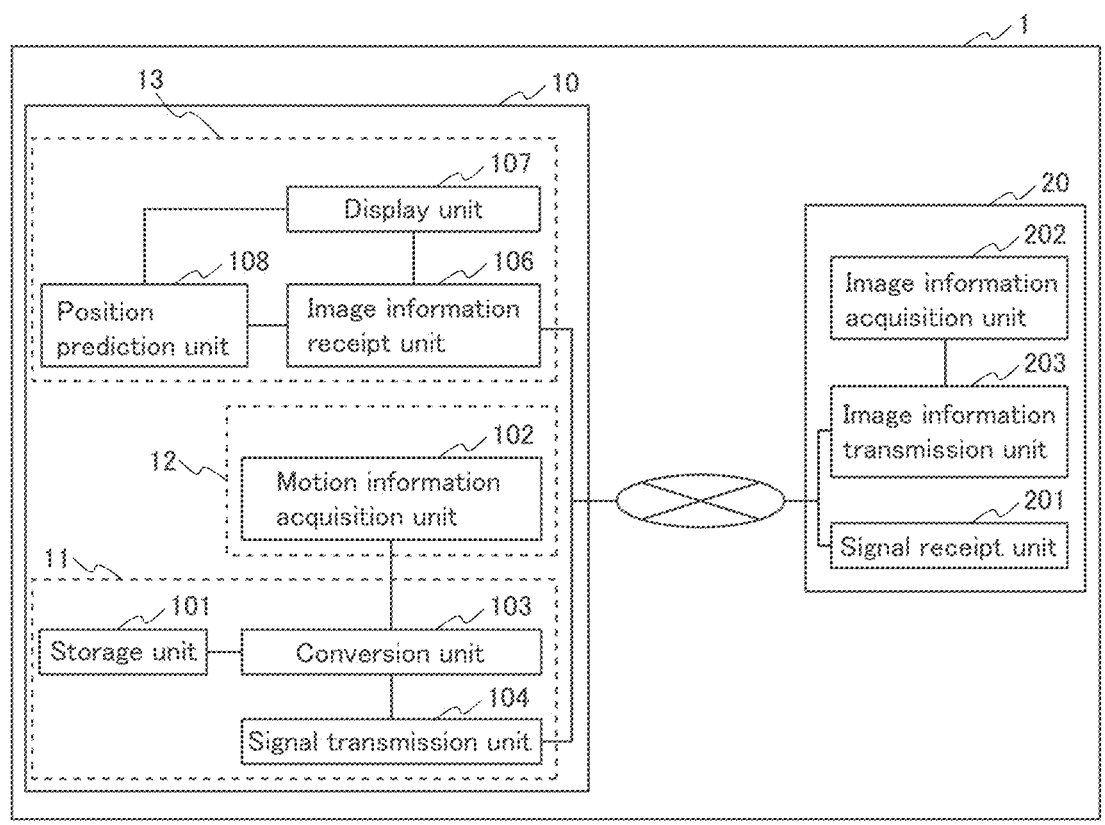
FIG. 11 is a block diagram showing an example of the moving object operation system according to the fourth example embodiment of the present invention.

FIG. 11 is a block diagram showing a moving object operation system according to the present example embodiment. As shown in FIG. 11, in the moving object operation system 1 of the present example embodiment, the operation signal transmitter 10 further includes a position prediction unit 108.

The operation signal transmitter 10 may be an operation signal transmission system, as described above. The operation signal transmission system 10 includes the main body 11 and two terminals 12 and 13 as described above. The position prediction unit 108 may further include, for example, a terminal 13 including the image information receipt unit 106 and the display unit 107.

The position prediction unit 108 predicts a future position of the moving object 20 based on the image information transmitted from the moving object 20, which is received by the image information receipt unit 106. The predicted position information obtained by the prediction may be, for example, position information after a predetermined period of time or position information over time. The position prediction unit 108 may be, for example, a CPU or the like.

The display unit 107 displays the received image information, and further displays a future position of the moving object 20 predicted by the position prediction unit 108. The display unit 107 may be, for example, a monitor for outputting images, and specific examples thereof include various image display apparatuses such as liquid crystal displays (LCDs), cathode ray tube (CRT) displays, and the like. The display unit may be, for example, a display unit provided in the auxiliary tool. In this case, examples of the terminal 13 including the display unit 107 include the above described auxiliary tools such as smartphones and tablets. The terminal 13 including the display unit 107 may be, for example, a human wearable display. Specifically, the terminal 13 including the display unit 107 may be, for example, a head mounted display or the like. When the display unit 107 is the wearable display, for example, the display unit 107 may also serve as the movement information acquisition unit 102.

Figure 12:
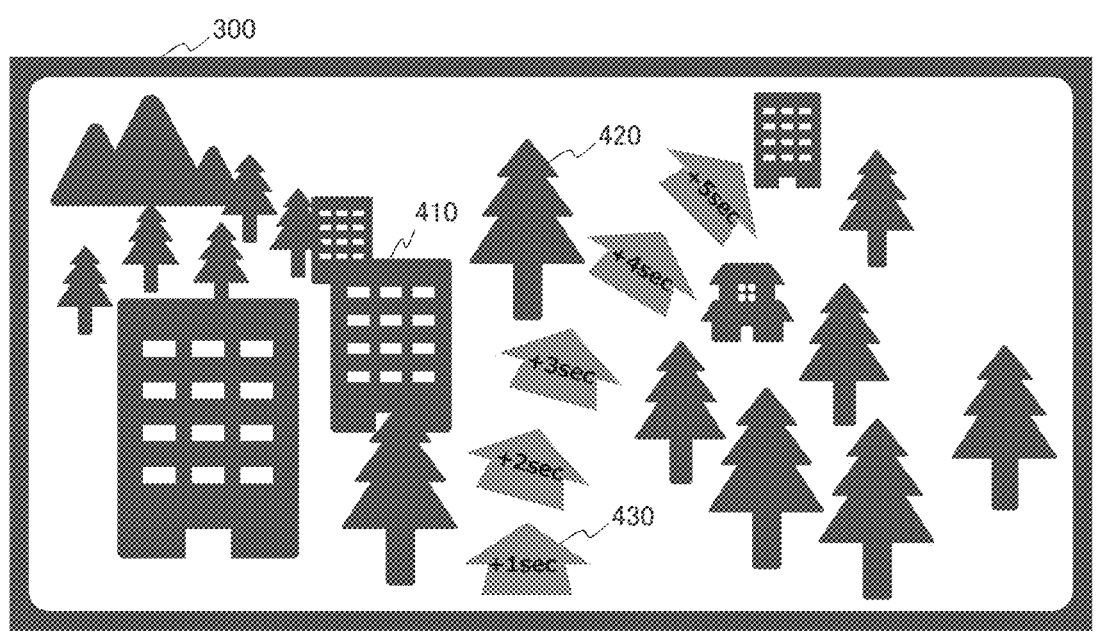
FIG. 12 is a schematic view showing an example of the display screen in the fourth example embodiment of the present invention.

FIG. 12 shows an example of the display screen of the display unit 107. FIG. 12 is merely for illustrative proposes and does not limit the present invention. As shown in FIG. 12, the display unit 107 displays buildings 410, trees 420, and the like as the image information received from the moving object 20 on the display screen 300. The display unit 107 further displays the predicted position information of the moving object 20 predicted by the position prediction unit 108. Specifically, as indicated by arrows 430 in FIG. 12, position information over time is displayed as the predicted position information. The arrows 430 indicate, for example, the position and the moving direction of the moving object 20 after a predetermined period of time. For example, as shown in FIG. 12, the predicted position information can indicate positions up to a predetermined time (e.g., after 5 seconds) in a predetermined time unit (e.g., every 1 second).

Figure 13:
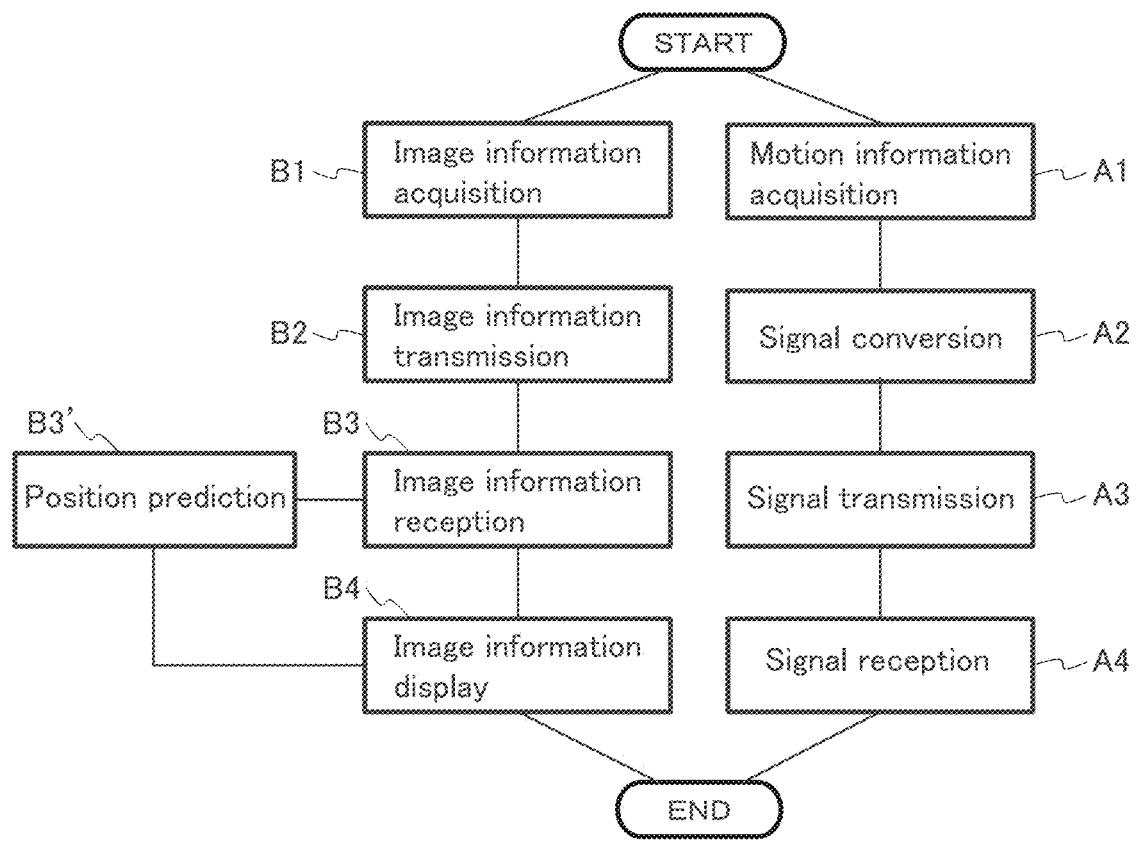
FIG. 13 is a flowchart showing an example of the moving object operation method according to the fourth example embodiment of the present invention.

FIG. 13 shows a flowchart of the moving object operation method according to the present example embodiment. The moving object operation method of the present example embodiment is performed as follows using, for example, the moving object operation system of FIG. 11. As shown in FIG. 13, the moving object operation method of the present example embodiment includes the step A1 (movement information acquisition), the step A2 (signal conversion), the step A3 (signal transmission), the step A4 (signal reception), the step B1 (image information acquisition), the step B2 (image information transmission), the step B3 (image information reception), a step B3' (position prediction), and the step B4 (image information display).

In the flowchart, the steps A1 to A4 are the same as in the example embodiments described above, and the steps B1 to B4 are performed in parallel with the steps A1 to A4.

(B1) Image Information Acquisition

In the step B1, the image information is acquired by the moving object 20.

(B2) Image Information Transmission

In the step B2, the image information acquired by the moving object 20 is transmitted to the operation signal transmitter 10.

(B3) Image Information Reception

In the step B3, the operation signal transmitter 10 receives the image information transmitted from the moving object 20.

(B3') Position Prediction

In the step B3', a future position of the moving object 20 is predicted based on the image information received by the operation signal transmitter 10.

(B4) Image Information Display

In the step B4, the image information received by the operation signal transmitter 10 and predicted position information are displayed.

Fifth Example Embodiment

The program according to the present example embodiment is a program that can execute the above-described moving object operation method on a computer. The program of the present example embodiment may be recorded on, for example, a computer-readable recording medium. The recording medium is not particularly limited, and examples thereof include random access memories (RAMs), read-only memories (ROMs), hard disks (HDs), optical disks, and Floppy® disks (FDs).

While the present invention has been described above with reference to illustrative example embodiments, the present invention is by no means limited thereto. Various changes and variations that may become apparent to those skilled in the art may be made in the configuration and specifics of the present invention without departing from the scope of the present invention.

This application claims priority from Japanese Patent Application No. 2016-150570 filed on Jul. 29, 2016. The entire subject matter of the Japanese Patent Application is incorporated herein by reference.

INDUSTRIAL APPLICABILITY

According to the present invention, an easier operation of a moving object can be achieved.

REFERENCE SIGNS LIST 1 moving object operation system
10 operation signal transmitter
20 moving object
30 ground
11 main body
12, 13 terminal
110 auxiliary tool
120 support
101 storage unit
102 movement information acquisition unit
103 conversion unit
104 signal transmission unit
105 sound information acquisition unit
106 image information receipt unit
107 display unit
108 position prediction unit
201 signal receipt unit
202 image information acquisition unit
203 image information transmission unit
300 display screen
410 building
420 tree
Q one end of support 120

What is claimed is:

1. A moving object operation system comprising:
a moving object; and
an operation signal transmitter for the moving object, wherein
the moving object comprises:
  a signal receipt unit that receives an operation signal from the operation signal transmitter,
wherein the operation signal transmitter comprises:
  an auxiliary tool;
  a storage unit that contains conversion information;
  a movement information acquisition unit that acquires auxiliary tool movement information associated with motion of an operator, with the auxiliary tool at a predetermined position as a reference point;
  a conversion unit that converts the acquired movement information into the operation signal based on the conversion information;
  a signal transmission unit that transmits the operation signal to the moving object; and
  a rod-shaped support, one end of which is fixed to a ground, wherein the auxiliary tool is rotatably connected to another end of the support,
wherein the conversion information includes auxiliary tool movement information associated with human motion and operation signal information for instructing the moving object in how to move, and wherein the auxiliary tool movement information and the operation signal information are associated with each other and includes the following combinations (1) to (4):
  (1) a combination of a state in which an operator holding the auxiliary tool tilts the auxiliary tool backward and a forward movement of the moving object;
  (2) a combination of a state in which the operator tilts the auxiliary tool forward and a backward movement of the moving object;
  (3) a combination of a state in which the operator tilts the auxiliary tool rightward and a right turn of the moving object; and
  (4) a combination of a state in which the operator tilts the auxiliary tool leftward and a left turn of the moving object.

2. The moving object operation system according to claim 1, wherein
the auxiliary tool is connected to the support, at least one point of which is fixed, and
the auxiliary tool is movable with the fixed point of the support as a reference point.

3. The moving object operation system according to claim 1, wherein
the moving object is a flight vehicle.

4. The moving object operation system according to claim 3, wherein
the flight vehicle is a drone.

5. The moving object operation system according to claim 1, wherein
the auxiliary tool movement information includes a type of movement and a degree of movement,
wherein a moving object movement information includes a type of movement and a degree of movement, and
the operation signal information includes a type of movement to be instructed and a degree of movement to be instructed.

6. The moving object operation system according to claim 1, wherein
the operation signal transmitter further comprises:
  a sound information acquisition unit that acquires human sound information,
the conversion unit converts the acquired sound information into the operation signal to the moving object based on the conversion information, and
the conversion information further includes human sound information, and the sound information and the operation signal information are associated with each other.

7. The moving object operation system according to claim 1, wherein
the moving object further comprises:
  an image information acquisition unit that acquires image information; and
  an image information transmission unit that transmits the acquired image information to the operation signal transmitter, and
the operation signal transmitter further comprises:
  an image information receipt unit that receives the image information transmitted from the moving object; and
  a display unit that displays the image information.

8. The moving object operation system according to claim 7, wherein
the image information acquisition unit of the moving object is a camera.

9. The moving object operation system according to claim 7, wherein
the display unit of the operation signal transmitter is a human wearable display.

10. The moving object operation system according to claim 7, wherein
the operation signal transmitter further comprises:
  a position prediction unit that predicts a position of the moving object after a predetermined period of time based on the image information received by the image information receipt unit, and wherein the display unit displays the image information received by the image information receipt unit and the predicted position information obtained by the position prediction unit.

11. An operation signal transmission system for a moving object, comprising:

a auxiliary tool;

a storage unit that contains conversion information;

a movement information acquisition unit that acquires auxiliary tool movement information associated with motion of an operator, with the auxiliary tool at a predetermined position as a reference point;

a conversion unit that converts the acquired movement information into an operation signal based on the conversion information;

a signal transmission unit that transmits the operation signal to the moving object; and a rod-shaped support, one end of which is fixed to a ground, wherein the auxiliary tool is rotatably connected to another end of the support, wherein the conversion information includes auxiliary tool movement information associated with human motion, moving object movement information, and operation signal information for instructing the moving object in how to move, and wherein the auxiliary tool movement information, the moving object movement information, and the operation signal information are associated with one another and includes the following combinations (1) to (4):

(1) a combination of a state in which an operator holding the auxiliary tool tilts the auxiliary tool backward and a forward movement of the moving object;

(2) a combination of a state in which the operator tilts the auxiliary tool forward and a backward movement of the moving object;

(3) a combination of a state in which the operator tilts the auxiliary tool rightward and a right turn of the moving object; and (4) a combination of a state in which the operator tilts the auxiliary tool leftward and a left turn of the moving object.

12. The operation signal transmission system according to claim 11, wherein the auxiliary tool is connected to the support, at least one point of which is fixed, and the auxiliary tool is movable with the fixed point of the support as a reference point.

13. The operation signal transmission system according to claim 11, wherein the moving object is a flight vehicle.

14. The operation signal transmission system according to claim 13, wherein the flight vehicle is a drone.

15. The operation signal transmission system according to claim 11, wherein the auxiliary tool movement information includes a type of movement and a degree of movement, the moving object movement information includes a type of movement and a degree of movement, and the operation signal information includes a type of movement to be instructed and a degree of movement to be instructed.

16. The operation signal transmission system according to claim 11, further comprising:

a sound information acquisition unit that acquires human sound information, wherein the conversion unit converts the acquired sound information into the operation signal to the moving object based on the conversion information, and the conversion information further includes human sound information, and the sound information and the operation signal information are associated with each other.

17. A moving object operation method using a moving object and the operation signal transmission system according to claim 11, comprising:

acquiring auxiliary tool movement information associated with motion of an operator, with the auxiliary tool at a predetermined position as a reference point, by the system;

converting the acquired movement information into the operation signal based on the conversion information by the system;

transmitting the operation signal to the moving object by the system; and receiving the transmitted operation signal by the moving object, wherein the conversion information includes auxiliary tool movement information associated with human motion and operation signal information for instructing the moving object in how to move, and the auxiliary tool movement information and the operation signal information are associated with each other.

18. A non-transitory computer-readable recording medium storing a program, when executed by a processor, which performs the moving operation method according to claim 17.

* * * * *